US009361620B2

(12) United States Patent  (10) Patent No.: US 9,361,620 B2
Evans et al.  (45) Date of Patent: Jun. 7, 2016

(54) ELECTRONIC TRANSACTION SYSTEM WITH ENTITLEMENT AND PROMOTION ENGINES

(71) Applicants: Darran Evans, Vale of Galmorgan (GB); Amanda Truman, London (GB); Victor Leitch, Fife (GB); Alasdair Macdonald, Fife (GB); Ken McRobb, Glasgow (GB); David Robb, Fife (GB); Steven Saunders, Dundee (GB)

(72) Inventors: Darran Evans, Vale of Galmorgan (GB); Amanda Truman, London (GB); Victor Leitch, Fife (GB); Alasdair Macdonald, Fife (GB); Ken McRobb, Glasgow (GB); David Robb, Fife (GB); Steven Saunders, Dundee (GB)

(73) Assignee: Leisure Pass Group Limited, London (GB)

( * ) Notice: Subject to any disclaimer, the term of this patent is extended or adjusted under 35 U.S.C. 154(b) by 700 days.

(21) Appl. No.: 13/650,345

(22) Filed: Oct. 12, 2012

(65) Prior Publication Data

US 2013/0097006 A1  Apr. 18, 2013

Related U.S. Application Data

(60) Provisional application No. 61/547,176, filed on Oct. 14, 2011.

(51) Int. Cl.
*G06F 21/00* (2013.01)
*G06Q 20/38* (2012.01)
*G06Q 20/20* (2012.01)
*G06Q 30/06* (2012.01)

(52) U.S. Cl.
CPC .............. *G06Q 20/387* (2013.01); *G06Q 20/20* (2013.01); *G06Q 30/06* (2013.01)

(58) Field of Classification Search
USPC .............. 705/51, 16, 21, 59, 71; 380/44, 262, 380/278, 279
See application file for complete search history.

(56) References Cited

U.S. PATENT DOCUMENTS

| 5,309,355 | A | 5/1994 | Lockwood |
| 5,450,051 | A | 9/1995 | Stromberg |
| 5,504,321 | A | 4/1996 | Sheldon |
| 5,566,327 | A | 10/1996 | Sehr |

(Continued)

FOREIGN PATENT DOCUMENTS

| EP | 1039402 A2 | 9/2000 |
| EP | 0924634 A3 | 10/2000 |

(Continued)

*Primary Examiner* — Dante Ravetti
(74) *Attorney, Agent, or Firm* — Greenberg Traurig, LLP

(57) ABSTRACT

A system for selling and administering the redemption of travel site access and other privileges to consumers has a computer connected to the Internet that pushes and pulls data to and from a database including site and privilege data, such as, description, cost, purchases, access code, privilege redemption and promotion data. The consumer may purchase access to sites and goods over the Internet and are provided with an access code which can be presented to the consumer in a variety of forms in accordance with the consumer's preference. In one embodiment, the code is sent to a mobile phone or computer. Optionally, the mobile device can communicate with a point of sale device to allow access to a given site. The mobile device may also be used to send promotions, such as discounts, to the consumer, which may be programmatically selected and sent based upon logistical, empirical, timing and marketing criteria. Point of sale devices and human representatives may facilitate non-technical consumer use by conducting selected functions, such as the sale and redemption of privileges and the communication of promotions.

7 Claims, 5 Drawing Sheets

(56) References Cited

U.S. PATENT DOCUMENTS

| | | |
|---|---|---|
| 5,689,100 A | 11/1997 | Carrithers et al. |
| 5,761,647 A | 6/1998 | Boushy |
| 5,777,305 A | 7/1998 | Smith et al. |
| 5,945,653 A | 8/1999 | Walker et al. |
| 5,948,040 A | 9/1999 | DeLorme et al. |
| 5,987,430 A | 11/1999 | Van Horne et al. |
| 6,003,769 A | 12/1999 | Ebbing |
| 6,038,551 A | 3/2000 | Barlow et al. |
| 6,078,928 A | 6/2000 | Schnase et al. |
| 6,085,976 A | 7/2000 | Sehr |
| 6,105,008 A | 8/2000 | Davis et al. |
| 6,173,209 B1 | 1/2001 | Laval et al. |
| 6,233,604 B1 | 5/2001 | Van Horne et al. |
| 6,283,376 B1 | 9/2001 | Schuder et al. |
| 6,330,544 B1 | 12/2001 | Walker et al. |
| 6,363,351 B1 | 3/2002 | Moro |
| 6,385,591 B1 | 5/2002 | Mankoff |
| 6,386,451 B1 | 5/2002 | Sehr |
| 6,505,772 B1 | 1/2003 | Mollett et al. |
| 6,565,000 B2 | 5/2003 | Sehr |
| 6,575,361 B1 | 6/2003 | Graves |
| 6,601,233 B1 | 7/2003 | Underwood |
| 6,609,655 B1 | 8/2003 | Harrell |
| 6,609,658 B1 | 8/2003 | Sehr |
| 6,609,659 B2 | 8/2003 | Sehr |
| 6,648,222 B2 | 11/2003 | McDonald et al. |
| 6,657,543 B1 | 12/2003 | Chung |
| 6,705,518 B2 | 3/2004 | Park et al. |
| 6,776,332 B2 | 8/2004 | Allen et al. |
| 6,813,608 B1 | 11/2004 | Baranowski |
| 6,889,098 B1 | 5/2005 | Laval et al. |
| 6,910,627 B1 | 6/2005 | Simpson-Young et al. |
| 6,910,628 B1 | 6/2005 | Sehr |
| 6,926,203 B1 | 8/2005 | Sehr |
| 6,962,286 B2 | 11/2005 | Mawatari |
| 6,965,868 B1 | 11/2005 | Bednarek |
| 6,999,936 B2 | 2/2006 | Sehr |
| 7,031,945 B1 | 4/2006 | Donner |
| 7,083,084 B2 | 8/2006 | Graves et al. |
| 7,103,577 B2 | 9/2006 | Blair et al. |
| 7,181,410 B1 | 2/2007 | Jones et al. |
| 7,379,891 B1 | 5/2008 | Donner et al. |
| 7,415,424 B1 | 8/2008 | Donner |
| 7,419,427 B2 | 9/2008 | Boushy |
| 7,455,222 B2 | 11/2008 | Beck et al. |
| 7,496,523 B2 | 2/2009 | Walker et al. |
| 7,578,439 B2 | 8/2009 | Graves et al. |
| 7,599,847 B2 | 10/2009 | Block et al. |
| 7,610,208 B2 | 10/2009 | Salonen |
| 7,647,257 B2 | 1/2010 | Allen et al. |
| 7,753,259 B1 | 7/2010 | Taylor et al. |
| 7,761,314 B2 | 7/2010 | Fitzgerald et al. |
| 7,765,128 B2 | 7/2010 | Brooks et al. |
| 7,788,117 B2 | 8/2010 | Fitzgerald et al. |
| 7,805,323 B2 | 9/2010 | Fitzberald et al. |
| 7,818,195 B2 | 10/2010 | Coon et al. |
| 7,828,208 B2 | 11/2010 | Gangi |
| 7,841,519 B2 | 11/2010 | Beck et al. |
| 7,861,929 B2 | 1/2011 | Roth |
| 7,885,838 B2 | 2/2011 | Sabalvarro et al. |
| 7,926,711 B2 | 4/2011 | Taylor et al. |
| 7,992,776 B1 | 8/2011 | Ramachandran et al. |
| 8,014,505 B2 | 9/2011 | Lee et al. |
| 8,346,618 B2 | 1/2013 | Brooks et al. |
| 2001/0013011 A1 | 8/2001 | Day et al. |
| 2001/0016825 A1 | 8/2001 | Pugliese, III et al. |
| 2001/0018660 A1 | 8/2001 | Sehr |
| 2001/0041994 A1 | 11/2001 | Kim |
| 2002/0026348 A1 | 2/2002 | Fowler et al. |
| 2002/0046116 A1 | 4/2002 | Hohle et al. |
| 2002/0062253 A1 | 5/2002 | Dosh, Jr. et al. |
| 2002/0082925 A1 | 6/2002 | Herwig |
| 2002/0091793 A1 | 7/2002 | Sagie |
| 2002/0095318 A1 | 7/2002 | Parry |
| 2002/0100802 A1 | 8/2002 | Sehr |
| 2002/0100803 A1 | 8/2002 | Sehr |
| 2002/0100808 A1 | 8/2002 | Norwood et al. |
| 2002/0143558 A1 | 10/2002 | Joseph |
| 2003/0033272 A1 | 2/2003 | Himmel et al. |
| 2003/0036425 A1 | 2/2003 | Kaminkow et al. |
| 2003/0055689 A1 | 3/2003 | Block et al. |
| 2003/0080186 A1 | 5/2003 | McDonald et al. |
| 2003/0101145 A1 | 5/2003 | Fang et al. |
| 2003/0105641 A1 | 6/2003 | Lewis |
| 2003/0115126 A1 | 6/2003 | Pitroda |
| 2003/0220839 A1 | 11/2003 | Nguyen |
| 2003/0229793 A1 | 12/2003 | McCall et al. |
| 2004/0015403 A1 | 1/2004 | Moskowitz et al. |
| 2004/0050933 A1 | 3/2004 | Keronen et al. |
| 2004/0056087 A1 | 3/2004 | Bonneau, Jr. et al. |
| 2004/0099723 A1 | 5/2004 | Robertson |
| 2004/0117250 A1 | 6/2004 | Lubow et al. |
| 2004/0124246 A1 | 7/2004 | Allen et al. |
| 2004/0128241 A1 | 7/2004 | Akama |
| 2004/0137886 A1* | 7/2004 | Ross ............... G06Q 30/02 455/414.1 |
| 2004/0158482 A1 | 8/2004 | Hale et al. |
| 2004/0172316 A1 | 9/2004 | Hale et al. |
| 2004/0181424 A1 | 9/2004 | Hale et al. |
| 2004/0195312 A1 | 10/2004 | Mawatari |
| 2004/0210759 A1 | 10/2004 | Fitch et al. |
| 2004/0254836 A1* | 12/2004 | Emoke Barabas ...... G06Q 30/02 705/14.35 |
| 2005/0060173 A1 | 3/2005 | Hale et al. |
| 2006/0020517 A1 | 1/2006 | Brooks et al. |
| 2007/0094149 A1 | 4/2007 | Hochfield et al. |
| 2007/0179895 A1 | 8/2007 | Bishop et al. |
| 2007/0198432 A1 | 8/2007 | Pitroda et al. |
| 2008/0026816 A1* | 1/2008 | Sammon ............... G07F 17/32 463/20 |
| 2008/0099551 A1 | 5/2008 | Harper et al. |
| 2008/0103803 A1 | 5/2008 | Leach et al. |
| 2008/0147506 A1 | 6/2008 | Ling |
| 2008/0167991 A1 | 7/2008 | Carlson et al. |
| 2008/0255890 A1 | 10/2008 | Hilliard |
| 2008/0281702 A1 | 11/2008 | Kirkwood |
| 2008/0294502 A1 | 11/2008 | Broome |
| 2009/0043644 A1 | 2/2009 | Wilkman |
| 2009/0063351 A1 | 3/2009 | Schmeyer et al. |
| 2009/0070230 A1 | 3/2009 | Silverstein et al. |
| 2009/0089148 A1 | 4/2009 | Gujjar et al. |
| 2009/0089581 A1 | 4/2009 | Bishop et al. |
| 2009/0101706 A1 | 4/2009 | Boyd |
| 2009/0106115 A1 | 4/2009 | James et al. |
| 2009/0125429 A1 | 5/2009 | Takayama |
| 2009/0239512 A1 | 9/2009 | Hammad et al. |
| 2010/0076833 A1 | 3/2010 | Nelsen |
| 2010/0076862 A1 | 3/2010 | Lefkowitz |
| 2010/0088149 A1 | 4/2010 | Sullivan et al. |
| 2010/0121697 A1 | 5/2010 | Lin et al. |
| 2010/0211436 A1 | 8/2010 | Checketts et al. |
| 2010/0250351 A1 | 9/2010 | Gillenson et al. |
| 2010/0252624 A1 | 10/2010 | Van De Velde et al. |
| 2010/0320268 A1 | 12/2010 | Brooks et al. |
| 2010/0324921 A1 | 12/2010 | Fitzgerald et al. |
| 2011/0015934 A1 | 1/2011 | Rowe et al. |
| 2011/0015976 A1 | 1/2011 | Lempel et al. |
| 2011/0022405 A1 | 1/2011 | Heinz et al. |
| 2011/0022425 A1 | 1/2011 | Block et al. |
| 2011/0040655 A1 | 2/2011 | Hendrickson |
| 2011/0099046 A1 | 4/2011 | Weiss et al. |
| 2011/0124324 A9 | 5/2011 | Friedenthal et al. |
| 2011/0196711 A1 | 8/2011 | Craig et al. |
| 2011/0208599 A1 | 8/2011 | Sen et al. |
| 2011/0281630 A1 | 11/2011 | Omar |
| 2012/0158531 A1* | 6/2012 | Dion ............... G06Q 10/10 705/26.1 |
| 2012/0265630 A1 | 10/2012 | McLaughlin et al. |

(56) References Cited

U.S. PATENT DOCUMENTS

| | | |
|---|---|---|
| 2012/0265671 A1 | 10/2012 | Higgins et al. |
| 2012/0323691 A1 | 12/2012 | McLaughlin et al. |
| 2012/0324542 A1 | 12/2012 | McLaughlin et al. |

FOREIGN PATENT DOCUMENTS

| | | |
|---|---|---|
| EP | 1039403 A3 | 9/2003 |
| GB | 2043839 A | 1/2006 |
| WO | WO 98/59324 | 12/1998 |
| WO | WO 99/10824 | 3/1999 |
| WO | WO 00/74300 A1 | 12/2000 |
| WO | WO 01/17262 A1 | 3/2001 |
| WO | WO 01/84474 A2 | 11/2001 |
| WO | WO 01/86599 A2 | 11/2001 |
| WO | WO 01/84474 A3 | 1/2002 |
| WO | WO 02/01485 A1 | 1/2002 |
| WO | WO 01/86599 A3 | 5/2002 |
| WO | WO 02/82386 A1 | 10/2002 |
| WO | WO 03/034267 A1 | 4/2003 |
| WO | WO 03/067369 A2 | 8/2003 |
| WO | WO 2004/003651 A1 | 1/2004 |
| WO | WO 2004/036515 A1 | 4/2004 |
| WO | WO 03/067369 A3 | 4/2005 |
| WO | WO 2012/141985 | 10/2012 |
| WO | WO 2012/174261 A2 | 12/2012 |

\* cited by examiner

ELECTRONIC TRANSACTION SYSTEM WITH ENTITLEMENT AND PROMOTION ENGINES

CROSS-REFERENCE TO RELATED APPLICATIONS

This application claims the benefit of U.S. Provisional Application Ser. No. 61/547,176 filed Oct. 14, 2011, the disclosure of which is incorporated herein by reference in its entirety.

FIELD OF THE INVENTION

The present invention relates to systems and methods for providing access to facilities, events and places requiring authorization and/or an entrance, purchase or use fee, (e.g., tourist attractions) and, more particularly, to systems that provide such access, as well as promotions associated with tourist attractions, through the use of customer-held passes that incorporate a variety of entitlement schemes.

BACKGROUND OF THE INVENTION

Tourism is a vibrant practice in the United States as well as in foreign countries for vacationers. For some cities and states, tourism also provides much needed economic activity that helps improve the quality of life for its residents. As a result, many tourist attractions, including those in the entertainment and hospitality industry, have been set up to cater to tourists as they visit various attractions located in particular cities. Such attractions include guided tours, museums, amusement parks, hotel resorts, and novelty gift shops.

To assist tourists in facilitating their enjoyment of certain attractions, systems have been developed to allow tourists to visit and obtain access to such attractions using a pass system. Examples of such systems include a transaction system for tourist attractions comprising a plurality of merchant terminals at respective attractions and a plurality of pass cards. In this system, each card is loaded with a token which defines the attributes of the pass or passes provided by the card. Each merchant terminal can write data to the cards to amend the tokens or to add new tokens. This system allows customers to re-use existing cards at tourist attractions worldwide. The system also enables the activities of the customer to be controlled in accordance with their previous activities which are stored on the card. The present invention provides a number of improvements upon such systems, as will be described in further detail below.

SUMMARY OF THE INVENTION

According to one embodiment of the present disclosure, a method for selling site-related privileges over the Internet to consumers through consumer's digital devices connected to the Internet, features storing data pertaining to a plurality of sites and associated available privileges, including privilege description and cost data, in a database in a digital data storage device accessible to a computer connected to the Internet. A computer is programmed with a program that accesses the database and the Internet and is capable of performing the steps of: querying the consumer via a consumer interface presented on the Internet and available to the consumer's digital device connected to the Internet to view data concerning sites of interest and related privileges; retrieving data from the database related to privileges of interest to the consumer in response to consumer responses to the querying conducted; presenting the data retrieved to the consumer; querying the consumer to select privileges to purchase; in the event that the consumer elects to purchase a privilege, presenting payment options to the consumer and recording responsive payment option information provided by the consumer in the database; recording privilege purchase data pertaining to the privileges purchased by the consumer, in the database; developing access data through which the consumer may access purchased privileges and storing the access data in the database in association with the privilege purchase data pertaining to one or more purchased privileges; communicating the access data to the consumer to empower the consumer to redeem the purchased privileges; and when the consumer chooses to redeem the privileges purchased, receiving access data from the consumer and retrieving privilege purchase data from the database that is associated with the access data. Upon receiving valid access data, the consumer is permitted to redeem purchased privileges by granting access to the privileges and the redemption data is recorded in the database.

In another embodiment of the disclosure, the step of communicating is by communication sent over the Internet to a digital device accessible to the consumer.

In another embodiment of the present disclosure, the step of receiving access data from a consumer is via a chain of communication from the digital device to a point of sale device, over the Internet, to the computer.

In another embodiment of the present disclosure, the step of communicating is by email.

In another embodiment of the present disclosure, the access data is printable and further conducting the step of printing the access data on a substrate, wherein the step of receiving includes scanning the printed access data at a point of sale device.

In another embodiment of the present disclosure, when purchased privilege data is retrieved from the database that indicates that there are no redeemable purchased privileges associated with the access data received from the consumer, then the consumer is granted access to no privileges.

In another embodiment of the present disclosure, the denial of privileges is based upon the access data having been reported as lost or stolen.

In another embodiment of the present disclosure, the steps of querying about sites and privileges, retrieving, presenting, querying to select privileges, paying, recording and developing access data, may be repeated in the event that a consumer wishes to purchase additional privileges in addition to those previously purchased.

In another embodiment of the present disclosure, the consumer may select a media type for storing the access data and select how the access data is communicated to the consumer.

In another embodiment of the present disclosure, the step of selecting media type includes selecting from at least one of an email, a card with a magnetic strip, a smart card, a substrate with a bar code, a substrate with a matrix code, a thumb drive, a substrate with printed access data thereon and a memory stick.

In another embodiment of the present disclosure, a method for selling site-related privileges to consumers having access to a mobile communication device, includes: storing data pertaining to a plurality of sites and associated available privileges, including privilege identification data, privilege cost data and promotional data, in a database in a digital data storage device accessible to a computer. The consumer is queried to select privileges to purchase. The computer is programmed to access the database and performs the following steps: in the event that the consumer elects to purchase a privilege, recording privilege purchase data pertaining to the privileges purchased by the consumer, in the database; developing access data through which the consumer may access purchased privileges and storing the access data in the database in association with the privilege purchase data; communicating the access data to the consumer to empower the consumer to redeem the purchased privileges; when the consumer chooses to redeem the privileges purchased, receiving access data from the consumer and retrieving privileges purchase data from the database that is associated with the access data; upon receiving valid access data, permitting the consumer to redeem purchased privileges by granting access to the privileges; recording redemption data in the database; and communicating at least some portion of the promotional data to the consumer by sending the promotional data to the consumer's mobile communication device.

In another embodiment of the present disclosure, the promotional data includes a financial incentive to purchase available privileges.

In another embodiment of the present disclosure, the financial incentive is a discount on the purchase of an available privilege benefiting the consumer to whom the promotional data is sent.

In another embodiment of the present disclosure, criteria are defined, including criteria for identifying consumers to whom promotional data will be sent and checking the existence of the criteria before communicating the promotional data.

In another embodiment of the present disclosure, the criteria include a given space/time proximity between available privileges promoted by the promotional data and redeemed purchased privileges.

In another embodiment of the present disclosure, the step of communicating the promotional data to the consumer is timed relative to the time of redemption of a given purchased privilege.

In another embodiment of the present disclosure, the criteria includes logistical compatibility with a given scenario of purchased privilege redemption.

In another embodiment of the present disclosure, promotional data is related to at least some instances of privilege data in the database.

In another embodiment of the present disclosure, the promotional data sent to the mobile communication device is communicable to a point of sale device to allow the consumer to receive a benefit conferred by the promotional data.

In another embodiment of the present disclosure, a method for selling site-related privileges to consumers having access to a mobile communication device, includes: storing data pertaining to a plurality of sites and associated available privileges, including privilege identification and cost data, in a database in a digital data storage device accessible to a computer; and querying a consumer to select privileges to purchase. A program in the computer is invoked that accesses the database and that performs the following steps: in the event that the consumer elects to purchase a privilege, recording privilege purchase data pertaining to the privilege purchased by the consumer, in the database; developing access data through which the consumer may access purchased privileges and storing the access data in the database in association with the privilege purchase data; communicating the access data to the consumer's mobile communication device to empower the consumer to redeem the purchased privileges; when the consumer chooses to redeem the privileges purchased, receiving access data from the consumer and retrieving privileges purchase data from the database that is associated with the access data; upon receiving valid access data, permitting the consumer to redeem purchased privileges by granting access to the privileges; and recording redemption data in the database.

In another embodiment of the present disclosure, the mobile communication device is at least one of a telephone, a personal computer, a personal digital assistant, a net-book, and an e-book reader.

In another embodiment of the present disclosure, the point of sale device has a scanner and the mobile communication device has a display and wherein the step of receiving access data includes reading the access data displayed in visually perceptible form on the mobile communication device with the scanner of the point of sale device.

In another embodiment of the present disclosure, the mobile communication device communicates with the point of sale device via near field communication.

In another embodiment of the present disclosure, the quantity of privileges purchased may be expressed in a combination of number of admissions, ranging from 1 to any given number, over a given time period, ranging from a given limited time to an unlimited time.

In another embodiment of the present disclosure, a system for selling site-related privileges to consumers with access to a mobile communication device and to the Internet and subsequently administering the redemption of the privileges by the consumers, includes a digital data storage device. A database having a data structure capable of storing data pertaining to a plurality of sites and associated available privileges, including privilege description and cost and purchase data, access data by which the consumers access purchased privileges, privilege redemption data and promotion data, all in digital form is stored in the data storage device. A computer programmed with an entitlement engine is connected to the data storage device and is capable of retrieving and writing data from and to the database under the control of the entitlement engine and of generating, storing and communicating access data through which the consumer may access privileges. The computer is capable of being connected to the Internet to allow the exchange of data with consumers. The computer is programmed with a consumer interface capable of presenting data from the database pertaining to available privileges and receiving data from the consumer pertaining to privilege purchases for storage in the database. The computer is programmed with a verification interface capable of receiving access data and communicating access to purchased privileges granted by the entitlement engine, and a promotion engine capable of retrieving promotion data from the database for presentation to the consumer via the mobile communication device.

In another embodiment of the present disclosure, the promotion data includes incentive data, consumer communication data identifying details required for presenting the promotion data to the customer's mobile communication device and criteria data that is tested to determine whether the promotion data will be sent to a given consumer, the promotion engine being capable of periodically comparing empirical data concerning the consumer against criteria data to ascertain whether given promotion data should be sent and sending the promotion data to the consumer when the criteria is met.

In another embodiment of the present disclosure, the promotion engine is capable of writing scheduling data to the database indicating a given time for sending promotions, of checking the time, and of sending a promotion to the consumer at an allotted time.

In another embodiment of the present disclosure, the promotion engine has an interface capable of receiving the data used by the promotion engine as input by a user and storing the data in the database, the promotion engine interface also being capable of allowing a user to associate promotions to site-related privileges and to set criteria and timing data for sending the promotions to the consumer.

In another embodiment of the present disclosure, the entitlement engine is capable of sending access data to the mobile communication device.

In another embodiment of the present disclosure, the verification interface is capable of receiving access data from the mobile communication device through the intermediation of a point of sale device connected to the Internet.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Figure 1:
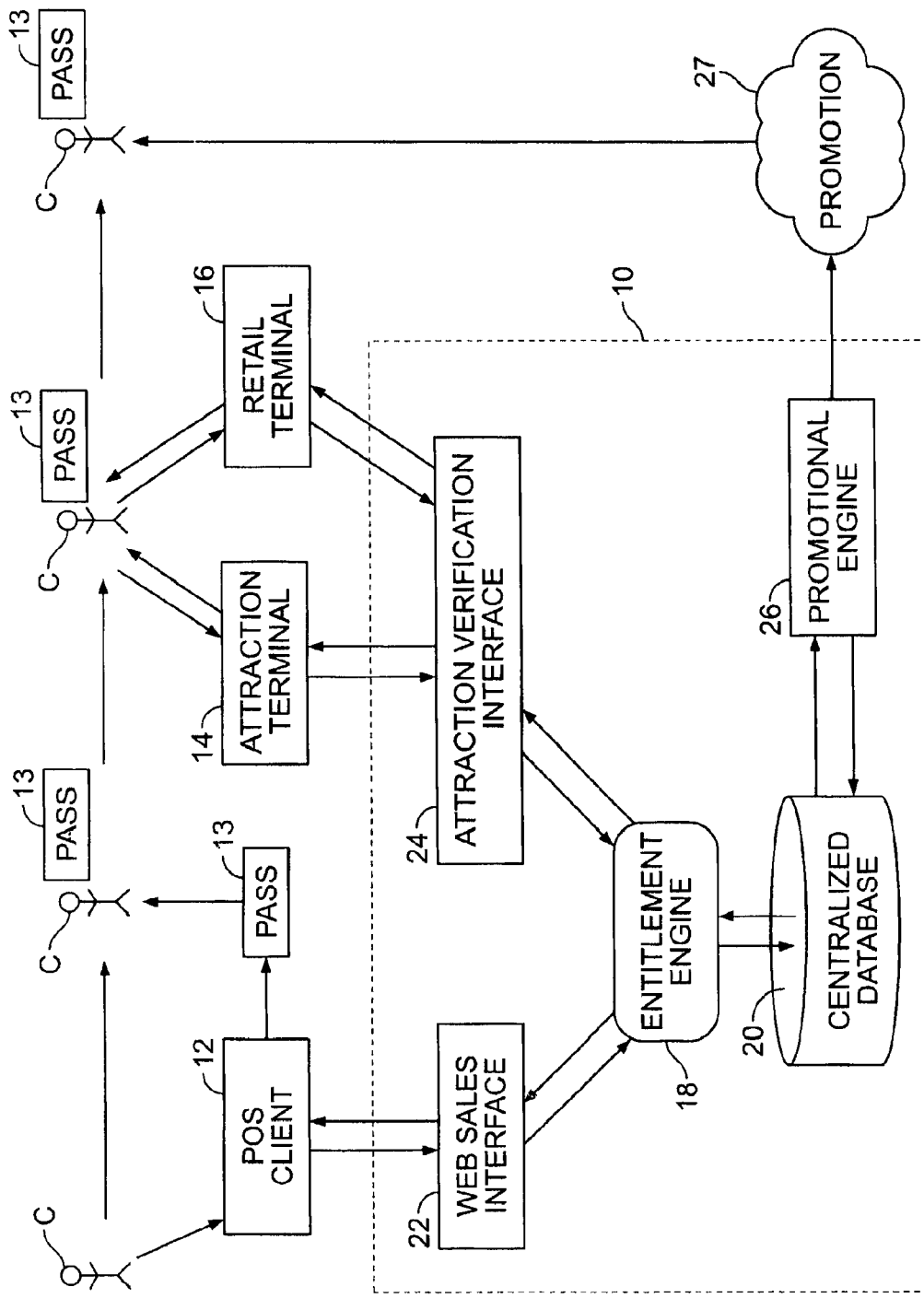
FIG. 1 is a diagram of a electronic transaction system in accordance with an embodiment of the present invention.

The present disclosure relates to an electronic transaction system for enabling tourists to obtain access to various tourist or other attractions through the use of a pass. As explained more fully below, a pass may be embodied in a variety of forms, including data written to media, such as a card with a magnetic strip, a thumb drive, a smart card, or the memory of a computer, smart phone, PDA, net book, e-book reader or other digital device, which may or may not be a mobile device. A pass can be embodied in data that could be communicated and remembered or stored, e.g., a key code, a password, PIN or other alphanumeric sequence. The data may be translated into one or more forms, e.g., written or displayed in alphanumeric characters, bar codes, matrix codes or the like. The present disclosure allows a customer to obtain a pass having certain entitlements to privileges associated with various facilities, events and places, such as tourist attractions, and to use the pass at one or more terminals or gate-keeping facilities located at or around the various tourist or other attractions in order to obtain a benefit associated with the attraction, such as access thereto or a good or service associated therewith. In one embodiment, the present invention also allows for a customer who has already obtained a pass having certain entitlements to subsequently add additional entitlements thereto. In another embodiment, the present invention allows for promotions to be communicated to a customer while the customer is enjoying the use of his or her pass.

As used herein, the term "attraction site" refers to a location, facility, event or establishment that may be frequented by interested persons (i.e., tourists) visiting the city or country in which the location, facility, event or establishment resides. An attraction site can be a historical location of interest, such as the Westminster Abbey in London, England or the Liberty Bell in Philadelphia, Pa., a facility for enjoying and appreciating culture, such as the Natural History Museum or Museum of Modern Art in New York City, N.Y., an entertainment event, such as a theater performance or an art show, or a commercial establishment, such as a restaurant or place of hospitality located in proximity to one of the aforementioned locations, facilities or events.

As used herein, the terms "entitlement" and "purchased privilege" refer to a privilege or license afforded to a customer that provides a benefit to the customer, which may be associated with one or more attraction sites. Entitlements and purchased privileges may be obtained by the customer through an exchange of value or may be granted gratuitously to the consumer, e.g., as part of a promotion offered to the consumer. Examples of an entitlement include access to a particular attraction site or a location within an attraction site, an ability to purchase goods from or within an attraction site, and a discount towards goods or services provided by or associated with an attraction site. In the present invention, one or more entitlements can be associated with or applied to a pass, which can be purchased by a customer and used at various attraction sites to obtain the benefit associated with each underlying entitlement. Various entitlements/privileges can be purchased individually, bundled as part of a comprehensive scheme or provided to a customer as a promotion, as discussed below in greater detail.

FIG. 1 shows one embodiment of an electronic transaction system according to the present invention, indicated generally at 10, for creating and fulfilling tourist passes to customers/consumers C and subsequently providing the benefits of each pass's entitlements at various attraction sites when the consumer redeems the purchased privilege. The system 10 is connected to various point-of-sale (POS) clients 12 that facilitate creating and distributing entitlement-loaded passes 13 to customers. Examples of POS clients 12 that can be utilized with the system 10 include, but are not limited to, a smart card terminal, a cash register in a retail establishment, a general purpose computer having a specially enabled POS emulator, a personal computer having a web browser able to access an Internet sales interface, a mobile telecommunications device capable of data transmission and reception, or a mobile personal digital assistant ("PDA") or smart phone having a specially enabled computer application installed thereon. The system 10 can fulfill passes 13 in a number of different pass embodiments, including, but not limited to, a smart card, a card with a magnetic readable strip, a card bearing a barcode or matrix code, or an electronic token (i.e., a generated key number sequence that enables an electronic device to serve as an electronic key) that can be transmitted and recorded onto a mobile telecommunications device, including a PDA or smart phone. In response to purchases or gratuitous granting of privileges to consumers, the system generates, stores and communicates access data to the consumer, be that a key code, password, PIN or other form of data, that the consumer may later present to a gatekeeper of a site with privileges to prove that the consumer is entitled to a given privilege. The access data is checked by the computer system to verify that it has been associated with the privilege and/or the consumer in question.

The system 10 is also connected to various attraction terminals 14 and retail terminals 16, each of which is located in proximity to one of many attraction sites and which may also be of the same nature as the point of sale terminals described above. For example, a sales terminal at a site may be capable of selling and/or redeeming pass or purchase privileges. An attraction terminal 14 operates to allow access to a particular attraction site for a customer C having a pass 13 with an entitlement associated with the particular attraction site, while a retail terminal 16 operates to allow a customer C having a pass 13 with the appropriate entitlement to purchase goods at the particular attraction site. While serving different functions, the attraction terminal 14 and retail terminal 16 can be embodied in similar or identical types of hardware. Examples of such hardware are described above and include, but are not limited to, an online terminal that is Internet-connected via Ethernet, WiFi or mobile telephony, or an online general purpose computer having specially enabled "virtual terminal" software.

The system 10 is provided with an entitlement engine 18 that creates passes 13 for customers, validates entitlements associated with passes 13 when they are used at an attraction terminal 14 or retail terminal 16 (i.e., checks for entitlements/purchased privileges on passes 13 associated with an attraction site and reports a grant or deny instruction to the attraction terminal 14 or retail terminal 16), and records entitlement usage. The entitlement engine 18 is connected to a centralized database 20 which stores identifying data related to each pass and entitlement created by the entitlement engine 18, as will be discussed further below. The system 10 is also provided with a plurality of defined interfaces that allow various devices and software applications to connect to and interact with the system 10. Such interfaces include a web sales interface 22 that allows customers to create and purchase passes within the system 10 through a variety of different POS clients 12, and an attraction verification interface 24 to allow customers to validate the entitlements associated with their respective passes with the entitlement engine 18 of the system 10 through interaction with attraction terminals 14 and/or retail terminals 16.

In accordance with one embodiment of the present invention, the system 10, including the entitlement engine 18, centralized database 20, web sales interface 22 and attraction verification interface 24, maintains a live connection to the Internet. Similarly, the POS clients 12, the attraction terminals 14 and the retail terminals 16 are all connected to the Internet and able to communicate with the system 10. This online configuration allows for instantaneous communication of transaction information between the attraction and retail terminals 14, 16 and the entitlement engine 18. Thus, when a customer uses his or her pass 13 at either an attraction terminal 14 or a retail terminal 16, the terminal is able to transmit information received from the pass 13 instantaneously to the entitlement engine 18. The entitlement engine 18 is then able to process the information, verify the entitlements associated with the pass and immediately transmit the results back to the attraction terminal 14 or retail terminal 16. Thus, there is no need to store or "bank" any transaction information associated with pass usage at each attraction terminal 14 or retail terminal 16, and there is no need to have predetermined pass entitlement definitions loaded onto each attraction terminal 14 or retail terminal 16 prior to the use of a pass 13 in connection therewith. This affords the system 10 the flexibility of incorporating inexpensive attraction and retail terminals 14, 16 at any location within range of an Internet connection, whether it be wired, wireless and/or shared by a router.

In addition, with the system 10 being online, the entitlement engine 18 is able to support a variety of different ways to apply entitlements against a pass, which allows the system 10 to support a complex variety of different passes. For instance, the entitlement engine 18 can create a pass that is allowed unlimited access to only a defined list of attraction sites, as well as a pass that is allowed access to an unlimited number of attraction sites, but only for a defined number of times. Other varieties include, but are not limited to, a pass with a defined number of visits to a defined list of attraction sites, a pass with an unlimited or defined number of visits per attraction site, a pass limited to one visit per day, a pass restricted to visits only during certain times of the day or certain days of the week, and a pass having any combination of the entitlements listed above. The entitlement engine 18 is able to record the various restrictions and the complex nature of the entitlements in the centralized database 20 to ensure it can correctly identify whether a valid entitlement can be found for a given attraction site.

In one embodiment of the present invention, the entitlement engine 18 is able to apply additional entitlements to already existing passes, both at the point of sale and subsequently thereafter, e.g., through a point of sale client 12, attraction terminal 14 or retail terminal 16. In some prior systems, passes were created with predetermined entitlement setups that could not be modified at the customer's wish. These predetermined passes were then provided to customers at the point of sale and were used until they expired, at which point they had to be reactivated with a new predetermined pass in order to be used again. However, in an online system 10, a customer C can purchase a pass 13 according to his or her needs at the POS client 12 and then, at a subsequent point in time, purchase additional entitlements, (also known as "bolt-on" entitlements) that the system 10 can contemporaneously apply to the pass 13 via the entitlement engine 18. Thus, the entitlement engine 18 provides the customer C with the ability to continuously add "bolt-on" entitlements to his or her existing pass 13, thereby giving the customer C the freedom to customize and expand the pass's 13 entitlements throughout its life.

Still referring to FIG. 1, the system 10 includes a promotional engine 26 that is able to create and provide promotions 27 (e.g., free or discounted entitlements) to customers C with active passes 13. Promotions 27 can be created by the promotional engine 26 based on the entitlements applied to the pass 13, as well as based on empirical data, e.g., relating to actual use of the pass 13. For example, if a customer C uses the pass 13 to access the Natural History Museum in New York City at 11:00 AM, the associated transaction information is transmitted to the entitlement engine 18 and recorded in the centralized database 20. Thereafter, the promotional engine 26 can recognize when and where the pass 13 was used (i.e., that the pass 13 was used at the Natural History Museum in New York City at 11:00 AM), and can subsequently send a promotion 27 to the customer (e.g., a coupon entitling the customer C to a 20% discount off lunch at a local restaurant within walking distance of the Natural History Museum—measured geographically or in time) via SMS text or email to the customer's mobile telecommunications device. Accordingly the promotions can be designed based upon reasonable logistical scenarios of consumer movement in time and space.

In one embodiment of the present invention, the promotional engine 26 is able to utilize at least two types of promotions: global promotions, which are provided unconditionally to all customers having active passes that are set up to receive promotions; and localized promotions, which are provided to certain customers with active passes based on certain conditions or criteria being met. Such conditions can be related to the time and day of a customer's pass activity and/or the location of the attraction sites at which such activity took place. Once the promotional engine 26 determines that a customer is eligible for a promotion, the promotional engine 26 can then provide the promotion to the customer using a variety of different mechanisms, including, but not limited to, transmission of an email message containing a bar code or matrix code to the customer's email account, transmission of an SMS text containing the promotional message to the customer's mobile phone or PDA, or via direct application to a customer's pass with an associated notice transmitted to the customer via email or SMS text. A promotion can be provided to eligible customers either instantaneously or after a time delay following a particular activity, such as obtaining access to a particular attraction site.

Figure 2:
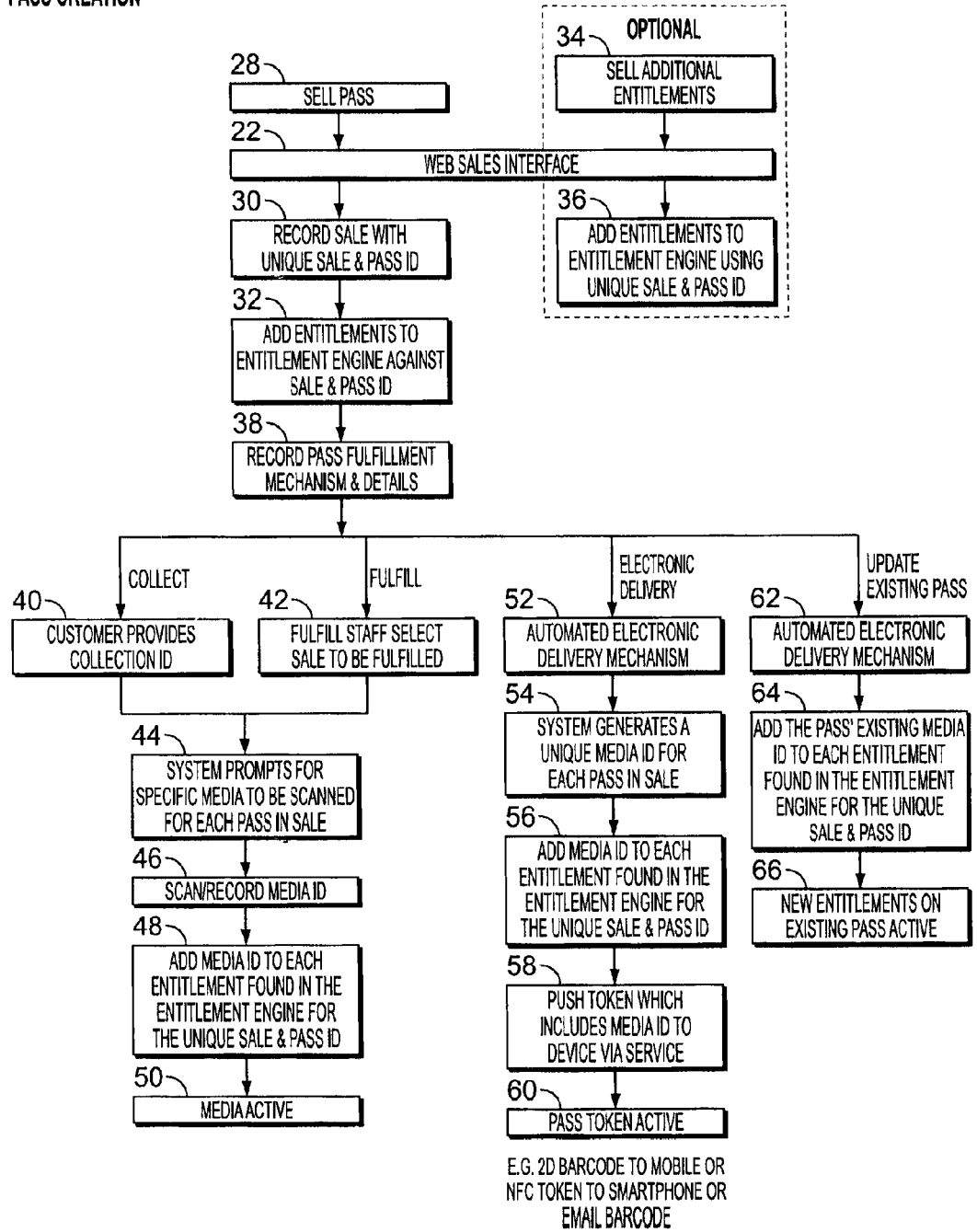
FIG. 2 is a flow chart showing a method for creating a pass using the electronic transaction system shown in FIG. 1.

FIG. 2 illustrates a method by which the system 10 creates a pass 13 for a customer C. Once the customer accesses the POS client 12 to obtain a pass 13, the system 10 communicates with the customer via the POS client 12 connected to the web sales interface 22 and sells the pass 13 having certain entitlements to the customer C (step 28). The system 10, via the entitlement engine 18, then records the sale of the pass 13 in the centralized database 20 and assigns the pass 13 a unique Sale and Pass ID (step 30). Once the pass 13 has a Sale and Pass ID, the entitlements which the customer C purchased, are added to the entitlement engine 18 and are recorded against the Sale and Pass ID in the centralized database 20 (step 32). At this point, the customer has the option of purchasing additional entitlements to apply to his or her pass. If the customer elects to purchase additional "bolt-on" entitlements, the customer C may engage the web sales interface 22 again, whereby the system 10 sells the "bolt-on" entitlements to the customer C (step 34) and then adds them to the entitlement engine 18, which records the "bolt-on" entitlements against the Sale and Pass ID (step 36).

After the pass 13 has been successfully created and its Sale and Pass ID recorded in the centralized database 20 with the appropriate entitlements applied thereto, the web sales interface 22 will prompt the customer C to define how he or she wishes to have the pass 13 fulfilled (step 38). The customer C can have the pass 13 fulfilled through a number of different channels, including, but not limited to, (i) the postal delivery to one's mailing address in the case of a physical medium (e.g., smart card, card with a barcode or matrix code, card with a magnetic strip, etc.), (ii) the contemporaneous activation and enablement of a physical medium at the POS client 12, or (iii) the transmission of an electronic pass (e.g., a token) to the customer's PDA or smart phone. Depending on the choice the customer C makes regarding fulfillment, a number of different steps can be taken. However, in each case, the customer C must provide a certain amount of information in order to properly effect the chosen fulfillment mechanism.

For example, if the customer chooses to have his or her pass fulfilled via postal delivery, the customer C provides sufficient identification (e.g., mailing address, telephone number, email address, etc.; noted as "Collection ID" in FIG. 2) to allow the customer C to collect the pass 13 (step 40). Alternatively, if the customer C wishes to have the pass 13 fulfilled on a physical medium and activated while the customer is at the POS client 12 (which may occur through the assistance of a sales person or fulfillment staff), the customer C merely identifies the particular pass 13 (in case the customer C purchased more than one pass) he or she would like fulfilled and activated (step 42). In either case, the web sales interface 22 prompts the customer C (or the sales person helping the customer C) to provide the specific medium to which the pass will be applied (step 44). Once the specific media is provided, the web sales interface 22, through the POS client 12, scans the specific medium and transmits a Media ID associated with the specific medium to the entitlement engine 18, which stores the Media ID on the centralized database 20 (step 46). The Media ID is then applied to each entitlement in the entitlement engine 18 associated with the customer's Sale & Pass ID (step 48). Once all these things are recorded in the centralized database 20, the Media ID is deemed active and the pass 13 is ready for use (step 50).

In another example, the customer may choose to have his or her pass provided via electronic transmission and delivery to a mobile telecommunications device, such as a cell phone, a PDA or a smart phone (step 52). If so, the customer provides the requisite information the system 10 needs in order to deliver the electronic pass (e.g., cell phone number, email address, mobile IP address, etc.). The system 10 then generates a unique Media ID for the customer's pass (step 54) and applies the Media ID to each entitlement in the entitlement engine 18 associated with the customer's Sale & Pass ID (step 56). The system 10 then creates access data, such as a token, key or password, which represents the pass 13 and includes the Media ID, and delivers it to the customer's telecommunications device (step 58), which can be effected via an email with the token attached, via SMS text with the token attached, or via direct download from the web sales interface 22 to the customer's mobile telecommunications device. The token is then activated and ready for use with the mobile telecommunications device (step 60).

It should be noted that the token can be expressed in a variety of coded communications through the mobile telecommunications device. In one embodiment, the token can be embodied in a two-dimensional barcode or matrix code that can be scanned from the face of the mobile telecommunications device. In a second embodiment where the mobile telecommunications device is a PDA or smart phone, the token can be embodied in a contactless token that can be validated via Bluetooth communication or near-field communication ("NFC") by placing the PDA or smart phone proximate to a Bluetooth or NFC receiver.

In the event that the customer has a pre-existing pass and has purchased "bolt-on" entitlements, the system 10 can automatically deliver the new entitlements directly to the customer's pass via the entitlement engine 18 (step 62). In such circumstances, the system 10 adds the Media ID of the customer's pass to each bolt-on entitlement associated with the customer's Sale and Pass ID (step 64). This can be done regardless of whether the Media ID is associated with a physical medium (i.e., a card) or a electronic token. Thereafter, the customer's new entitlements become active on his or her pre-existing pass (step 66).

Figure 3:
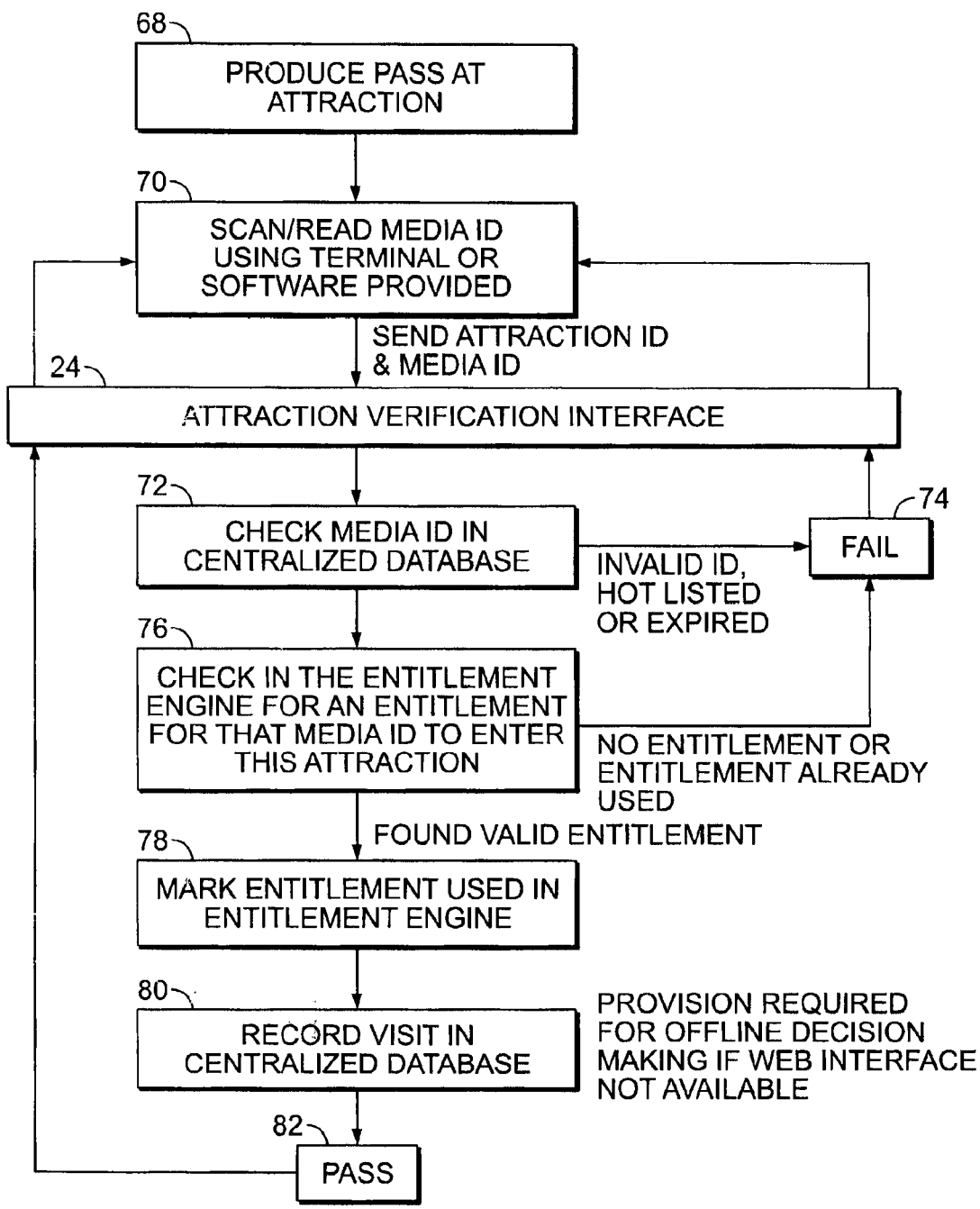
FIG. 3 is a flow chart showing a method for validating a pass using the electronic transaction system shown in FIG. 1.

FIG. 3 illustrates a method by which the system 10 validates passes at attraction terminals 14 and retail terminals 16. (For the sake of brevity, the word "terminal" will refer to either an attraction terminal 14 or a retail terminal 16, since their functions are similar.) At the outset, the customer presents his or her pass to the attraction site (step 68). Then, depending on the type of medium on which the customer's pass is embodied, the attraction site scans or reads the Media ID of the pass using the terminal's scanning equipment or verification software (step 70). Alternatively, the consumer may communicate a key code or password to a cashier or operator of a venue access point, which is then entered into a point of sale device for transmission to the system 10. The pass's Media ID and the attraction site's Attraction ID are then transmitted by the terminal to the system 10 via the attraction verification interface 24. The system 10 then checks the Media ID against its records in the centralized database 20 to determine if the Media ID is valid and active (step 72). If the system 10 determines that the pass's Media ID is invalid, expired or "hot listed" (i.e., the Media ID is deemed unacceptable for reasons such as it was reported lost or stolen by the purchaser or during transit to a commercial agent of the system owner/administrator, it was reported as faulty and was replaced, or it was not successfully delivered to the purchaser), the system 10 reports a failure message 74 to the attraction verification interface 24, which in turn transmits the failure message 74 to the attraction site's terminal.

If the pass's Media ID is deemed valid and active, the system 10 then checks the entitlement engine 18 for an entitlement associated with the Media ID that allows access to the attraction site (step 76). If no such entitlement is found or the appropriate entitlement found has been exhausted, the system 10 reports a failure message 74 to the attraction site's terminal via the attraction verification interface 24. If the entitlement engine 18 does find a valid and appropriate entitlement, the system 10 marks the entitlement as being used in the entitlement engine 18 (step 78) and records the visit to the attraction site in the centralized database 20 (step 80). The system 10 then reports a "PASS" message 82 to the attraction site's terminal via the attraction verification interface 22. The attraction site can then afford access to the customer C who used the pass 13.

With regard to pass validation, it should be noted that because the system 10 is an online system, it relies on an active Internet connection, whether it be a modem connection or an Ethernet connection, in order to function in the manner described above. However, in the event of a failure in the connectivity of the attraction verification interface 24 to an attraction site's terminal, the terminal may be equipped with provisions to make decisions on its own regarding validating entitlements on a pass with the limited information it has. These provisions can include, but are not limited to, checking that the Media ID conforms to the type, length format and number range associated with or expected for the attraction site, checking a locally stored database for hot-listed cards, and checking whatever extra information which may have been stored with the Media ID. Once a basic decision has been made by the attraction site to accept the Media ID, the terminal would then record the fact that the Media ID was accepted and granted access to the attraction site. This information would then be transferred to the system 10 once communication with the system 10 has been reestablished.

Figure 4:
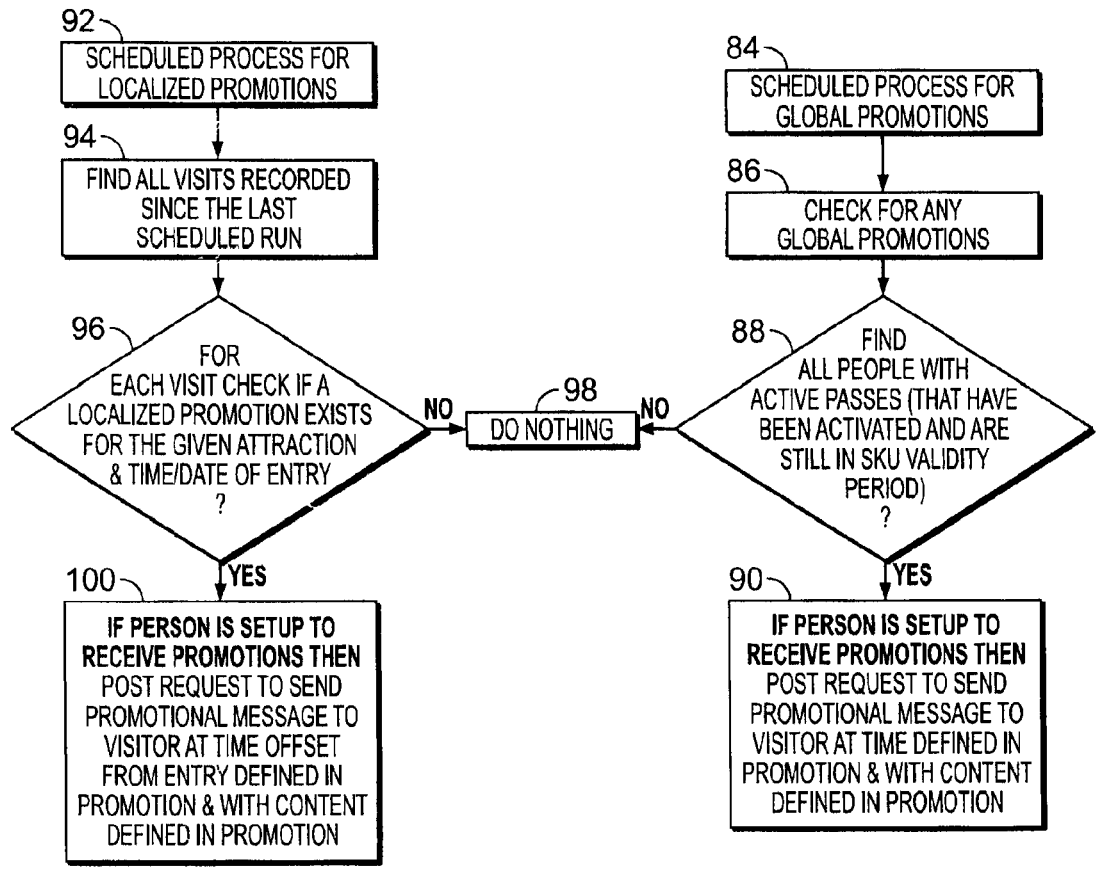
FIG. 4 is a flow chart showing methods of identifying and sending a promotion to a customer using the promotional engine of the system shown in FIG. 1.
Figure 4:
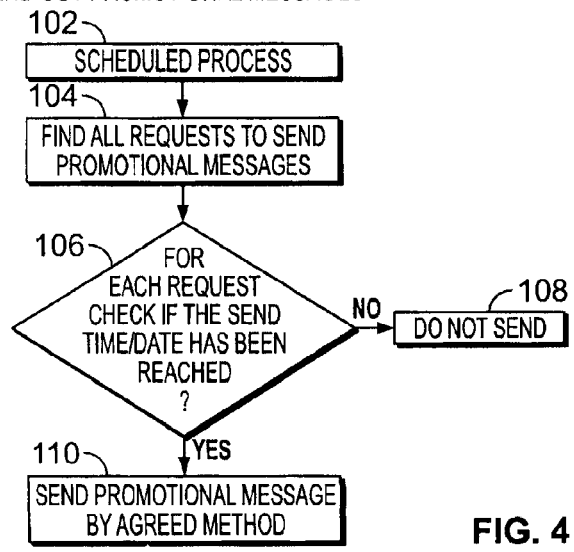

FIG. 4 illustrates methods by which the system 10 uses the promotional engine 26 to provide promotions to customers with active passes. As discussed above, the system 10 is capable of providing at least two types of promotions: global promotions and localized promotions. For global promotions, the promotional engine 26 executes a scheduled process, beginning at step 84, for identifying customer candidates to whom the promotional engine 26 may send global promotions. At the outset, the promotional engine 26 checks the centralized database 20 if any global promotions are available (step 86). If no global promotions are available, the promotional engine 26 does nothing (step 98) and the process begins again at the next scheduled time. If global promotions are available, the promotional engine 26 then locates all customers having active passes (step 88). If such customers exist and are setup to receive promotions, the promotional engine 26 posts a Request to send a global promotion to all such customers at a time defined in each global promotion's definition (step 90).

For localized promotions, the promotional engine 26 executes a scheduled process, beginning at step 92, for identifying customer candidates to whom the promotional engine 26 may send localized promotions. At the outset, the promotional engine 26 locates all pass validations (i.e., visits) stored in the centralized database 20 that have been recorded since the last scheduled process execution (step 94). For each visit, the promotional engine 26 checks if a localized promotion exists for the given Attraction ID and Time/Date entry (step 96). If a visit has no existing localized promotion associated therewith, the promotional engine 26 does nothing (step 98) and moves on to the next recorded visit. If a particular visit does have an existing localized promotion associated therewith and the customer against whom the visit was recorded is setup to receive promotions, the promotional engine 26 posts a Request to send the particular localized promotion to the customer either instantly or at a time offset defined in the localized promotion's definition (step 100).

Once a number of requests for global and localized promotions have been posted, the promotional engine 26 runs a scheduled process, beginning at step 102, by which the promotional engine 26 delivers the requested promotions to their respective customers. At the outset, the promotional engine 26 locates all requests to send promotions (step 104) and checks if the time and date conditions for delivery associated with each underlying promotion have been met (step 106). If such time and date conditions have not been met, the promotion is not sent to the customer (step 108) and the promotional engine 26 moves on to the next posted request. If, however, the time and date conditions of a promotion have been met, the promotional engine 26 delivers the promotion to the customer using the method of delivery agreed upon by the customer (step 110). As discussed above, such methods of delivery include, but are not limited to, transmission of an email message containing a bar code or matrix code to the customer's email account, transmission of an SMS text containing the promotional message to the customer's mobile phone or PDA, or via direct application to a customer's pass with an associated notice transmitted to the customer via email or SMS text.

Figure 5:
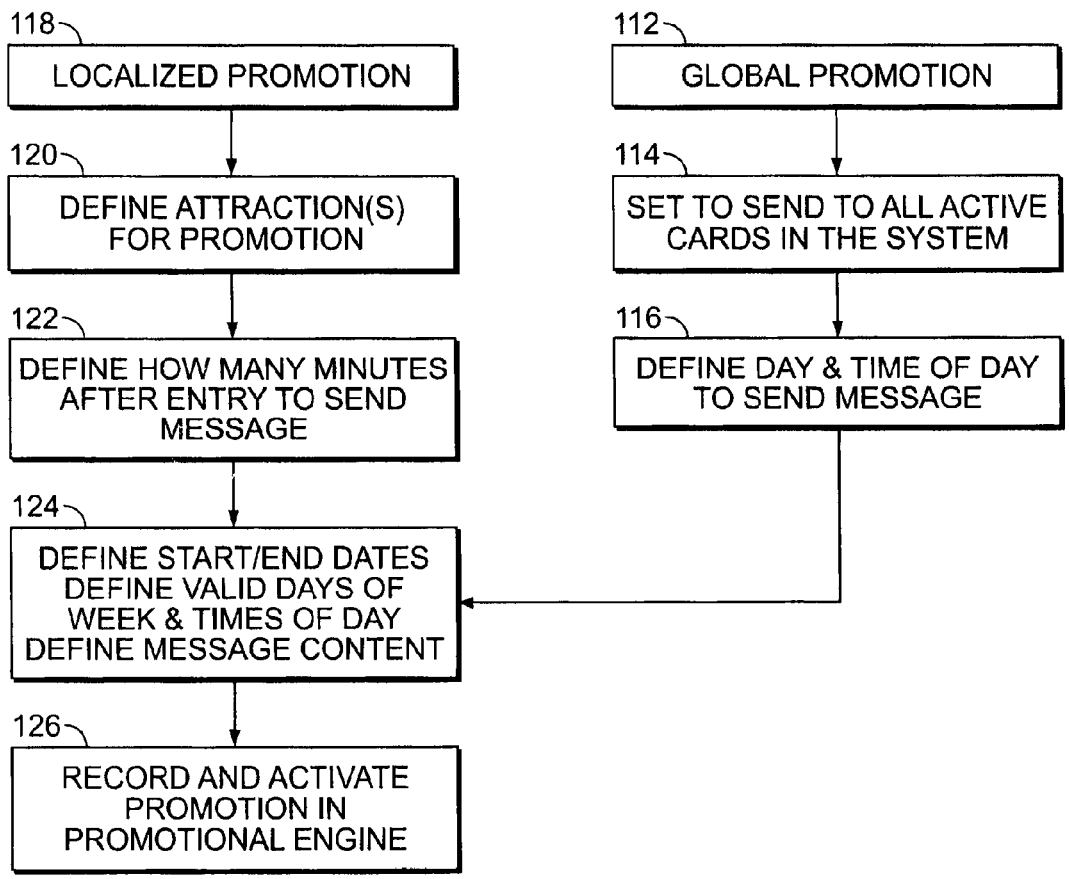
FIG. 5 is a flow chart showing a method of setting up a promotion to be used by the promotional engine in executing the methods shown in FIG. 4.

FIG. 5 illustrates a method of setting up a promotion that may be sent to a customer by the promotional engine 26. At the outset, the promoter (i.e., the individual or entity setting up the promotion) must choose whether it wants to set up a global promotion or a localized promotion, and then set the delivery conditions which must be met in order for the promotion to be sent. If the promoter chooses to create a global promotion (step 112), the promoter will first set the promotion to be sent to all active passes in the system 10 (step 114) and then define the date and time conditions on which the promotion engine 26 should send the global promotion (step 116). If the promoter chooses to create a localized promotion (step 118), the promoter will first define what attraction sites will be associated with the localized promotion (i.e., what attraction sites may be accessed in order to trigger the localized promotion) (step 120). The promoter will then define the amount of time the promotional engine 26 must delay the sending of the localized promotion after a triggering attraction site has been accessed or visited (step 122).

Once the delivery conditions of either a global promotion or localized promotion have been set, the promoter must then define the message content of the promotion in the promotional engine 26 (i.e., what the promotion is, whether it be a discount on goods or services associated with an attraction site; free access to an attraction site during a specified time period; etc.) and then set the promotion's parameters (step 124). The parameters set in step 124 include the start date and end date of the promotion's availability, as well as the days of the week and times of the day on which the promotion is available. Once the promotion's message content and parameters are set in the promotional engine 26, the promotion is recorded in the centralized database 20 and activated in the promotional engine 26, where it is ready to be sent to customers by the methods described and illustrated above and in FIG. 4.

It will be understood that the systems and methods described herein are merely exemplary of the present invention and that a person skilled in the art may make many variations and modifications without departing from the spirit and scope of the invention. All such variations and modifications are intended to be included within the scope of the invention.

We claim:

1. A method for selling site-related privileges to consumers having access to a mobile communication device, comprising:
    storing, by a computer, data pertaining to a plurality of attraction sites having a geographic location and associated available privileges, within a database in a digital data storage device accessible by the computer:
    wherein the data also includes privilege identification data, privilege cost data, and promotional data;
    querying, by the computer, a consumer to select privileges to purchase;
    wherein the selected privilege cost is reflected in the stored privilege cost data;
    determining, by the computer, that the consumer elects to purchase a privilege;
    based on a determination, that the consumer elects to purchase a privilege, recording the purchased privilege data as a completed purchase pertaining to the privileges purchased by the consumer, within the database;
    creating, by the computer, access data;
    wherein the created access data is used by the consumer to access purchased privileges;
    associating, by the computer, the created access data with the recorded privilege purchase data;
    storing, by the computer, the associated access data with the recorded privilege purchase data within the database;
    transmitting, by the computer, the created access data to the consumer;
    wherein the created access data is used by the consumer to redeem purchased privileges;
    determining, by the computer, that the consumer requests to redeem the privileges that he has purchased;
    based on a determination that the consumer requests to redeem the privileges that he has purchased, querying the consumer for his transmitted access data;
    receiving, by the computer, the queried transmitted access data;
    acquiring, by the computer, from the database, the associated access data with the recorded privilege purchase data;
    determining, by the computer, that the queried transmitted access data is valid;
    based on a determination that the queried transmitted access data is valid, redeeming the consumer purchased privileges by granting access to the consumer purchased privileges;
    wherein the access to the consumer purchased privileges is without further costs or performance requirements;
    creating, by the computer, redemption data;
    wherein the redemption data indicating that the consumer has received the purchased privileges;
    recording, by the computer, the created redemption data in the database;
    creating, by the computer, a criteria value that identifies consumers to whom the stored promotional data will be sent to;
    wherein the criteria value comprises a value for space/time proximity between a consumer and a site;
    verifying, by the computer, the existence of the created criteria value before communicating the stored promotional data to the consumer;
    determining, by the computer, sites associated with privileges that are be promoted by the promotional data;
    calculating, by the computer, a distance and travel time between the consumer at the location of redemption and the determined sites associated with privileges that are be promoted by the promotional data;
    wherein the calculating thereby defines a space/time proximity of the consumer to the sites;
    identifying, by the computer, without reference to phone location data, those consumers who are within the created criteria value for space/time proximity to a site at which the redemption occurs;
    determining, by the computer, that the consumer is within the created criteria value for space/time proximity of a site capable of being promoted by the promotional data;
    identifying, by the computer, the consumer that qualifies under the space/time proximity criteria for receiving promotional data; and
    communicating, by the computer, at least some portion of the promotional data applicable to at least one additional privilege of the plurality of available privileges to the consumer by sending the promotional data associated therewith to the consumer's mobile communication device.

2. The method of claim 1, wherein the step of communicating, by the computer, at least some portion of the promotional data includes communicating a financial incentive to purchase the at least one additional available privilege.

3. The method of claim 2, wherein the financial incentive is a discount capable of being applied to a cost of the purchase of the at least one additional available privilege benefiting the consumer to whom the promotional data is sent and further comprising the step of calculating, by the computer, a reduced price for the at least one additional available privilege purchased by the consumer.

4. The method of claim 1, wherein the step of communicating, by the computer, at least some portion of the promotional data to the consumer is timed relative to the time of redemption of a given purchased privilege.

5. The method of claim 1, wherein the consumer executes a scenario of travel through space/time when the consumer visits a plurality of sites to redeem purchased privileges, the consumer having a capacity to travel through space/time in executing a given scenario of site visits, and wherein the step of creating, by the computer, a criteria value includes ascertaining logistical compatibility of an additional site with a given scenario of purchased privilege redemption, such that visiting the additional site would not require the consumer to exceed the capacity of the consumer to travel through space/time.

6. The method of claim 1, further comprising the step of relating the promotional data to at least some instances of privilege data in the database.

7. The method of claim 1, wherein the promotional data sent to the mobile communication device is communicable to a point of sale device to allow the consumer to receive a benefit conferred by the promotional data.

* * * * *